M. H. JOHNSON.
ELECTRICALLY HEATED SOLDERING MACHINE.
APPLICATION FILED JUNE 1, 1908.
934,538.
Patented Sept. 21, 1909.
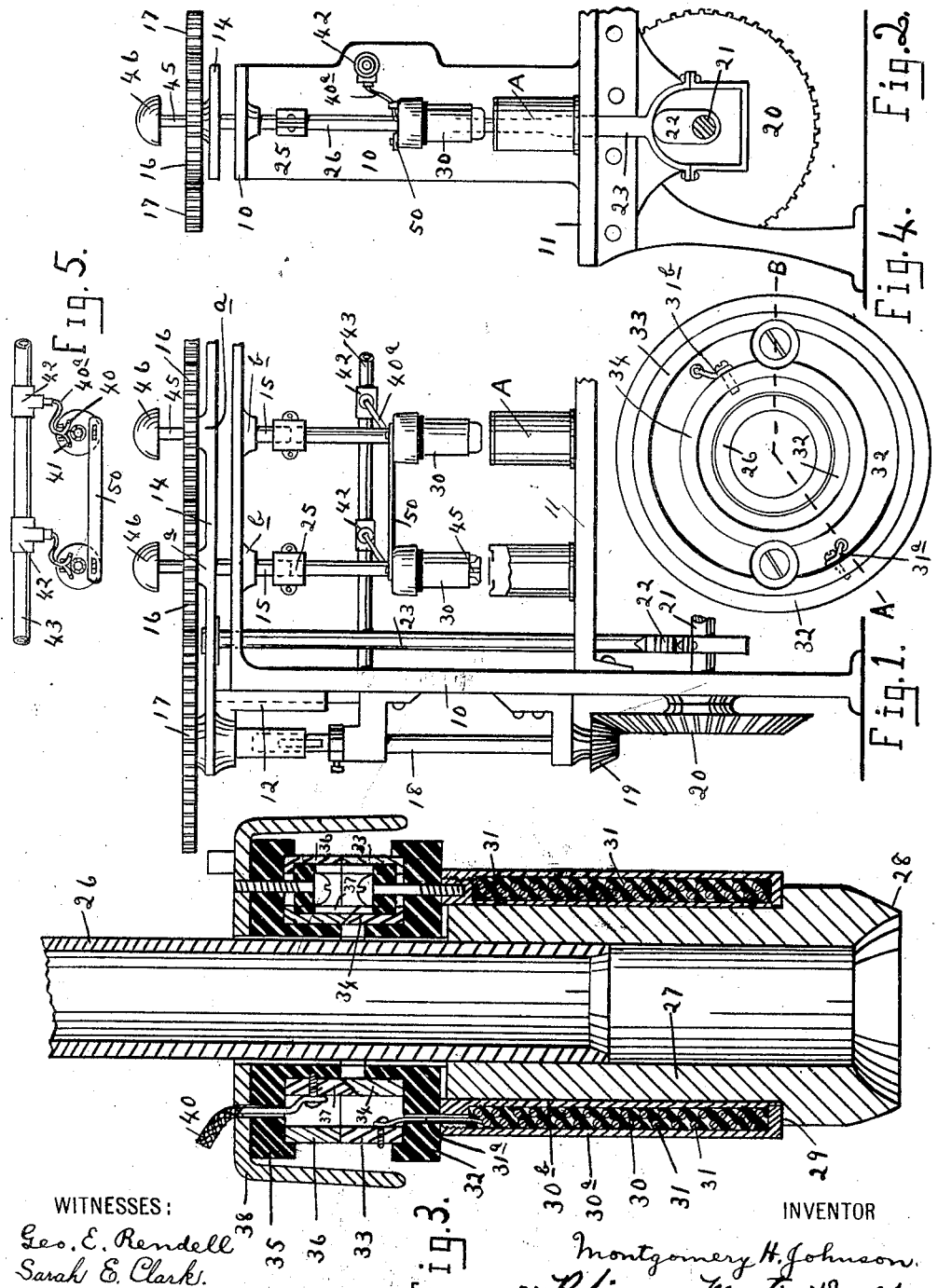
WITNESSES:
Geo. E. Rendell
Sarah E. Clarke
INVENTOR
Montgomery H. Johnson
BY Robinson, Martin & Jones
ATTORNEYS

UNITED STATES PATENT OFFICE.

MONTGOMERY H. JOHNSON, OF UTICA, NEW YORK.

ELECTRICALLY-HEATED SOLDERING-MACHINE.

934,538.

Specification of Letters Patent.    Patented Sept. 21, 1909.

Application filed June 1, 1908. Serial No. 435,872.

*To all whom it may concern:*

Be it known that I, MONTGOMERY H. JOHNSON, of Utica, in the county of Oneida and State of New York, have invented certain new and useful Improvements in Electrically-Heated Soldering-Machines; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide a soldering machine adapted for use on cans, having rotary electrically heated soldering irons of improved and simplified construction and arrangement, and which is efficient and adapted to withstand wear, substantially free from liability to get out of order and readily assembled and dismantled.

Figure 1 shows a partial side elevation of a machine embodying the features of my present improvement. Fig. 2 shows a partial cross-sectional view of the machine. Fig. 3 is an enlarged detail sectional view of the soldering iron with its appurtenances. Fig. 4 is a plan view of certain parts and shows by line A—B the section on which Fig. 3 is taken. Fig. 5 is a small detail plan view showing mainly electrical connection.

Referring to the reference letters and figures in a more particular description, 10 indicates the frame of the soldering machine which supports, among other things, the table 11 on which the cans A to be operated upon are arranged during the soldering operation. Supported on the upper portion of the frame on a slide 12 is a vertically movable bar 14. This bar 14 has bearings $a$, while the frame bar has bearings $b$, in which bearings the soldering iron spindles 15 are mounted. For rotating the spindles 15 they are severally provided with gear pinions 16 which span the space between the several spindles and intermesh. For driving the several pinions 16 there is provided a gear wheel 17 supported in a bearing on the bar 14 and telescopically connected with the upper end of the vertical shaft 18. The shaft 18 is provided at the lower end with a beveled gear 19 meshing with a beveled gear 20 on the main shaft 21. For raising and lowering the several soldering iron spindles 15 through the medium of the bar 14, there is provided on the shaft 21 a cam 22 which is connected by a connecting rod 23 with the bar 14, so that as the shaft 21 revolves and the spindles 15 are revolved, they will be raised and lowered. In raising and lowering the spindles 15 slide through the bearings $b$. The spindles are provided at their lower ends with clamps 25 by means of which the soldering irons are attached to the machine.

The soldering irons consist of a tubular shank 26 having a tubular body 27 secured on the lower end, this body terminating at the lower end in a circular operative edge or face 28. The body 27 is reduced above the lower end affording a shoulder 29, and above the shoulder the body is inclosed in a case 30 closely fitting the reduced portion of the body and resting on the shoulder 29.

The case 30 consists of two shells $30^a$ and $30^b$, the former having an inwardly projecting flange at its lower end and the latter having an outwardly projecting flange at its upper end, and these flanges are screw-threaded at their edges to engage with suitable screw threads in the shells. Within the case 30 there is provided an electrical heating coil 31 supported in a suitable mass of insulating matter, and the terminals of this coil 31 are indicated by $31^a$ and $31^b$ and are carried out through the upper end of the case. Secured on the upper end of the case 30 is a disk 32 of insulating material, as, for instance, slate. This disk is substantially a washer perforated to provide a passage for the shank 26. On the upper face of the disk 32 are mounted two terminal contact rings 33 and 34. The outer ring 33 is connected with one end, as $31^a$, of the heating coil, while the inner contact ring 34 is connected with the other end of the heating coil.

Surmounting the disk 32 is another disk 35 of insulating material and similar construction, which has secured to it on the underside the outer and inner contact rings 36 and 37 respectively. These rings correspond in diameter and location with the rings 33 and 34 respectively, so that when assembled the edges of the rings engage each other, as shown. The electric contact rings are protected by a cap 38 having a depending flange which is insulated with reference to the contacts.

To avoid depending on the bearing of the disk 35 on the spindle 26 to maintain the parts in correct position, the ring 37 will preferably be provided with an inclined edge engaging with the inclined face of the ring 34. From the rings 36 and 37 electrical conductors 40 and 41 are carried out through the top of the disk, and will be continued in a cord or cable 40ª for a sufficient length to adapt them to reach the outlet box 42 provided on the frame, which outlet box will preferably be provided with an ordinary electrical socket, while the end of the conductors 40 and 41 will be provided with the ordinary plug used in connection with electric lights and fixtures. Electric conductors will be brought to the several outlet boxes 42, which may be provided on the machine through a conduit as 43 supported on the frame of the machine. The cables 40ª are of sufficient length and flexibility to permit the soldering irons to have the desired movement up and down vertically. Each pair of insulating disks 35 will preferably be coupled together by a bar 50 which will serve to hold the insulating disks 35 together with their contact rings against rotation in connection with the soldering iron and the other parts moving therewith. An axial opening through the soldering iron, its shank 26 and the spindle 15 is provided to receive a push rod 45 provided with a weight 46 at its upper end. The push rod 45 rests on the can cap to maintain the same in position when the operative edge 28 of the soldering iron is lifted from the can.

It is evident that when electric current is supplied through conductors 40 and 41, that through the medium of the contact rings the circuit will be completed through the heating coil 30 effectively and with certainty, while permitting the soldering iron, the heating coil and its appurtenances to be rotated, and while also permitting the soldering iron to have the vertical movement which is necessary in this class of machine.

When in the operation of the machine the soldering iron descends, it operates upon the cap provided on the head of the can supported on the table of the machine in the well known manner.

It is evident that the current will be supplied to the heating coil of the soldering iron in a simple and efficient manner by the construction herein described, and that in case of trouble an iron can be readily removed from the machine and the heater and its appurtenances removed and replaced without trouble and with despatch by an ordinary machine operative. This may occur occasionally or frequently from trouble with the soldering iron and the metal adhering to its face, or from trouble with the heating coil, or from various troubles which beset devices of this character. It will also be noted that each soldering iron is quite independent from its neighbors in the machine and can be removed, replaced and assembled or taken apart without interference with neighboring irons.

What I claim as new and desire to secure by Letters Patent is:

1. The combination of a rotary soldering iron having a cylindrical body adjacent to its operative end, a cylindrical case mounted on the body, a heating coil in the case, insulated collector rings mounted on the end of the case to which the ends of the coils are respectively connected, a non-rotatable contact base supported on the top of the case and carrying contact for said collector rings respectively, substantially as set forth.

2. The combination in a soldering machine of a rotary soldering iron, a case mounted on and inclosing the body of the iron, a heating coil in the case, insulated collector rings mounted on the end of the case to which the ends of the coil are respectively connected, non-rotatable contact pieces engaging with the collector rings and flexible connections with said contact pieces, substantially as set forth.

3. The combination in a soldering machine of a spindle, a rotary soldering iron mounted thereon in suspended position, a case inclosing the body of the iron, a heating coil in the case, contact pieces to which the ends of the coils are respectively connected mounted on the case at different distances from the center of rotation of said soldering iron, other contact pieces held against rotary movement, and electrical conductors connected with said latter contact pieces, substantially as set forth.

4. In a soldering machine the combination of a spindle, a rotary soldering iron suspended thereon, a case inclosing the body of the iron, a heating coil mounted in the case, collector rings supported from the case and surrounding the spindle in circles of different radii and to which the ends of the coils are respectively connected, other non-rotatable rings surrounding the spindle and engaging with said collector rings respectively, and electric conductors connecting with said latter rings respectively, substantially as set forth.

5. In a soldering iron having a cylindrical body, a cylindrical case consisting of two shell cylinders of larger and smaller diameters respectively, the former having an inwardly projecting flange at one end and the latter having an outwardly projecting flange at the other end, a heating coil provided in the case, and means for making electrical connection with the ends of the coil respectively through the exterior of the cylindrical body of said iron, substantially as set forth.

6. The combination in a soldering machine of a spindle, a rotary soldering iron mounted thereon in suspended position, a heating coil arranged around the iron, contact pieces to which the ends of the coils are respectively connected mounted and encircling the spindle and being of larger and smaller diameters respectively, and non-rotatable contacts engaging with said contact pieces respectively, substantially as set forth.

In witness whereof, I have affixed my signature, in presence of two witnesses, this 16 day of May 1908.

MONTGOMERY H. JOHNSON.

Witnesses:
SARAH E. CLARK,
EMMA S. HESSE.